(12) United States Patent
Chan et al.

(10) Patent No.: US 7,032,502 B2
(45) Date of Patent: Apr. 25, 2006

(54) COFFEE MAKER

(75) Inventors: Chi Tong Chan, Hong Kong (HK); Kelvin Yip, Hong Kong (HK)

(73) Assignee: Simatelex Manufactory Co. Ltd., (HK)

( * ) Notice: Subject to any disclaimer, the term of this patent is extended or adjusted under 35 U.S.C. 154(b) by 605 days.

(21) Appl. No.: 10/256,710

(22) Filed: Sep. 27, 2002

(65) Prior Publication Data

US 2004/0060448 A1    Apr. 1, 2004

(51) Int. Cl.
*A47J 31/00*    (2006.01)
(52) U.S. Cl. ............... 99/283; 99/305; 99/307
(58) Field of Classification Search ............ 99/307, 99/305, 283, 280, 281, 282, 299
See application file for complete search history.

(56) References Cited

U.S. PATENT DOCUMENTS

| 4,169,978 | A | * | 10/1979 | Hauslein ................. 392/444 |
| 4,966,070 | A | * | 10/1990 | Frisch ................... 99/302 R |
| 5,357,848 | A | * | 10/1994 | Eugster et al. ............ 99/279 |
| 5,778,765 | A | * | 7/1998 | Klawuhn et al. .......... 99/290 |

* cited by examiner

*Primary Examiner*—Reginald L. Alexander
(74) *Attorney, Agent, or Firm*—Jackson Walker, LLP

(57) ABSTRACT

A coffee maker includes a water reservoir, an in-line water heater, a brew basket for receiving coffee grinds, and a water passage between the reservoir and the brew basket. The passage passes through the in-line water heater for delivering heated water to the brew basket. A a bi-directional valve disposed in the water passage between the water reservoir and the in-line water heater to permit substantially unrestricted flow in a first direction and restricted flow in a second direction. A controller can be provided for altering the valve between an unrestricted bi-directional mode and a unidirectional mode.

9 Claims, 6 Drawing Sheets ered water to the brew basket, partially heated water may flow into the brew basket and cool the final beverage.

COFFEE MAKER

FIELD OF THE INVENTION

The invention relates to coffee makers, and in particular to drip-type coffee makers.

BACKGROUND TO THE INVENTION

One method of making coffee includes passing heated water through coffee grinds in order to infuse the water with coffee flavour and aroma. A common type of coffee maker that employs this method is the so-called "drip-type" coffee maker.

Drip-type coffee makers comprise a water reservoir and a brew basket for receiving coffee grinds. A delivery tube or other water passage takes water from the water reservoir, through an in-line water heater, and delivers it to a spreader above coffee grinds in the brew basket. The heated water passes through the coffee grinds and in to a carafe, cup or other vessel. A one-way valve is positioned in the delivery tube between the water reservoir and in-line water heater to prevent heated water from returning to the water reservoir.

As the in-line water heater heats water from the reservoir the water expands in volume and creates considerable amount of steam pressure. Due to the present of the one-way valve the water is pushed out along the downstream portion of the delivery tube and dispenses through the spreader over the brew basket.

However, not all the water being pushed out of the spreader is fully heated to the desired optimum temperature owing to localized heating effect inside the heater. Partially heated water will flow into the brew basket through the spreader. The water must pass through the delivery tubes and the air gap between the spreader and brew basket before reaching the coffee grinds. During this time substantial heat can be lost from the water, particularly during the early stages of brewing when the delivery tubes and air gap have not had time to heat up.

Also, at the initial start of the brewing cycle an initial column of cold water inside the delivery tube downstream from the in-line water heater is pushed out, by this partially heated water, into the brew basket.

Thus, a problem with known coffeemakers is that the water temperature in the brew basket will always be lower during the initial stages of the brewing cycle. This lowers the temperature of the final coffee beverage and affects its quality.

SUMMARY OF THE INVENTION

It is the object of the present invention to overcome or ameliorate the above-mentioned problem, or at least to provide the public with a useful alternative.

According to a first aspect of the invention there is provided a coffee maker including:

a water reservoir,
an in-line water heater,
a brew basket for receiving coffee grinds,
a water passage between the reservoir and the brew basket, the passage passing through the in-line water heater for delivering heated water to the brew basket, and
a bi-directional valve disposed in the water passage between the water reservoir and the in-line water heater, the valve adapted to permit substantially unrestricted flow in a first direction and restricted flow in a second direction.

Preferably, the valve includes a housing with a water passage through it, a valve seat disposed within the water passage, and a valve body disposed within the water passage and movable from a first position clear of the valve seat and a second position in juxtaposition the valve seat, and wherein the valve seat has one or more recesses in it to permit restricted flow when the valve body is in the second position.

Preferably, restricted flow in the second direction is sufficient to reduce the volume of water delivered to the brew basket until the water is heated to a predetermined temperature.

According to a second aspect of the invention there is provided a coffee maker including:

a water reservoir,
an in-line water heater,
a brew basket for receiving coffee grinds,
a water passage between the reservoir and the brew basket, the passage passing through the in-line water heater for delivering heated water to the brew basket,
a valve disposed in the water passage between the water reservoir and the in-line water heater, and
a controller for altering the valve between a bi-directional mode and a unidirectional mode.

Preferably, in use, the valve is controlled in the bi-directional mode for a predetermined time or until water in the passage between the reservoir and the brew basket reaches a predetermined temperature, and the valve is then altered to the unidirectional mode.

Preferably, the controller is an electromechanical or bimetal device.

Preferably, the controller is a bimetal device incorporated within the valve and adapted to control the is valve in the bi-directional mode until water in the water passage reaches a predetermined temperature, and then alter the valve to the unidirectional mode.

Preferably, the valve includes a housing with a water passage through it, a valve seat disposed within the water passage, a valve body disposed within the water passage and movable from a first position clear of the valve seat and a second position in juxtaposition the valve seat, and a control stem movable between a bi-directional position in which the control stem engages the valve body in the first position and a unidirectional position in which the valve body is free to move between the first and second positions.

Further aspects of the invention will become apparent from the following description, which is given by way of example only.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

Figure 1:
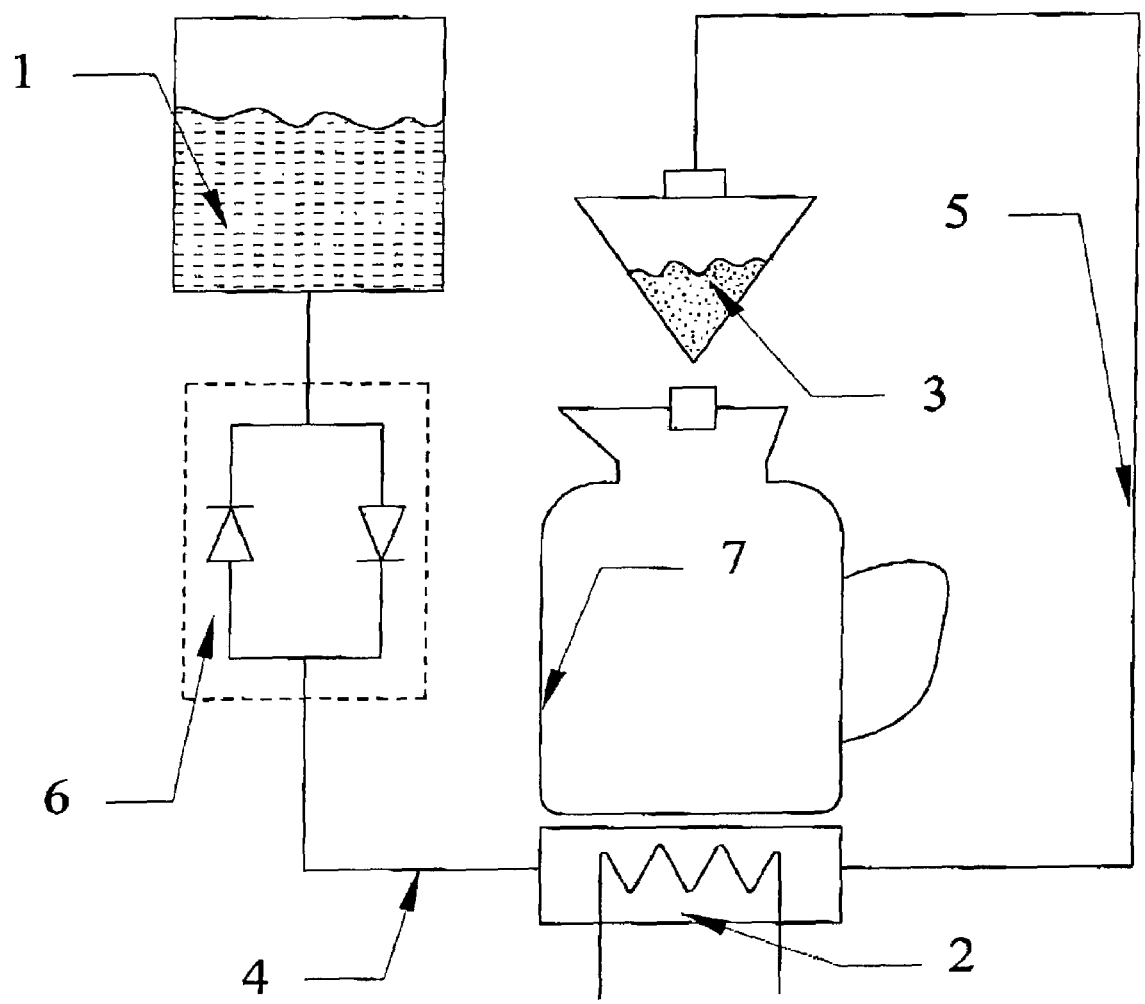
FIG. 1 illustrates a schematic diagram of a coffeemaker.

Referring to FIG. 1, a coffeemaker comprises a water supply reservoir 1, in-line water heater 2, brew basket 3, water delivery tubes/passages 4 and 5, a dual-flow control valve 6, and a container 7 for collecting brewed coffee.

The delivery tubes 4, 5 take water from the water reservoir 1, through the in-line water heater 2, and deliver it to coffee grinds in the brew basket 3. The heated water passes through the coffee grinds and in to the container 7. The brew basket contains a mesh or paper filter in known manner.

As the in-line water heater 2 heats water from the reservoir 1 the water expands in volume and creates steam pressure. Due to the dual-flow valve 6 water is permitted to flow back along delivery tube 4 to the reservoir 1 during the initial heating stage of a brew cycle. This minimises the volume of initial cold water in delivery tube 5 from being pushed out on to coffee grinds in the brew basket 3. Furthermore, an internal recycle heating action created causes the water to remain inside the in-line water heater 2 for an extended period of time compared to conventional coffeemaker designs. This helps to improve the heat absorption time and reduce the partial heating effect present in known coffee maker designs.

After a predetermined time period, or when the water temperature has reached a predetermined level, the apparent characteristic of the dual-flow valve 6 changes from one of substantially bi-directional to a substantially unidirectional mode so that the coffee maker operates in substantially known manner.

Figure 2:
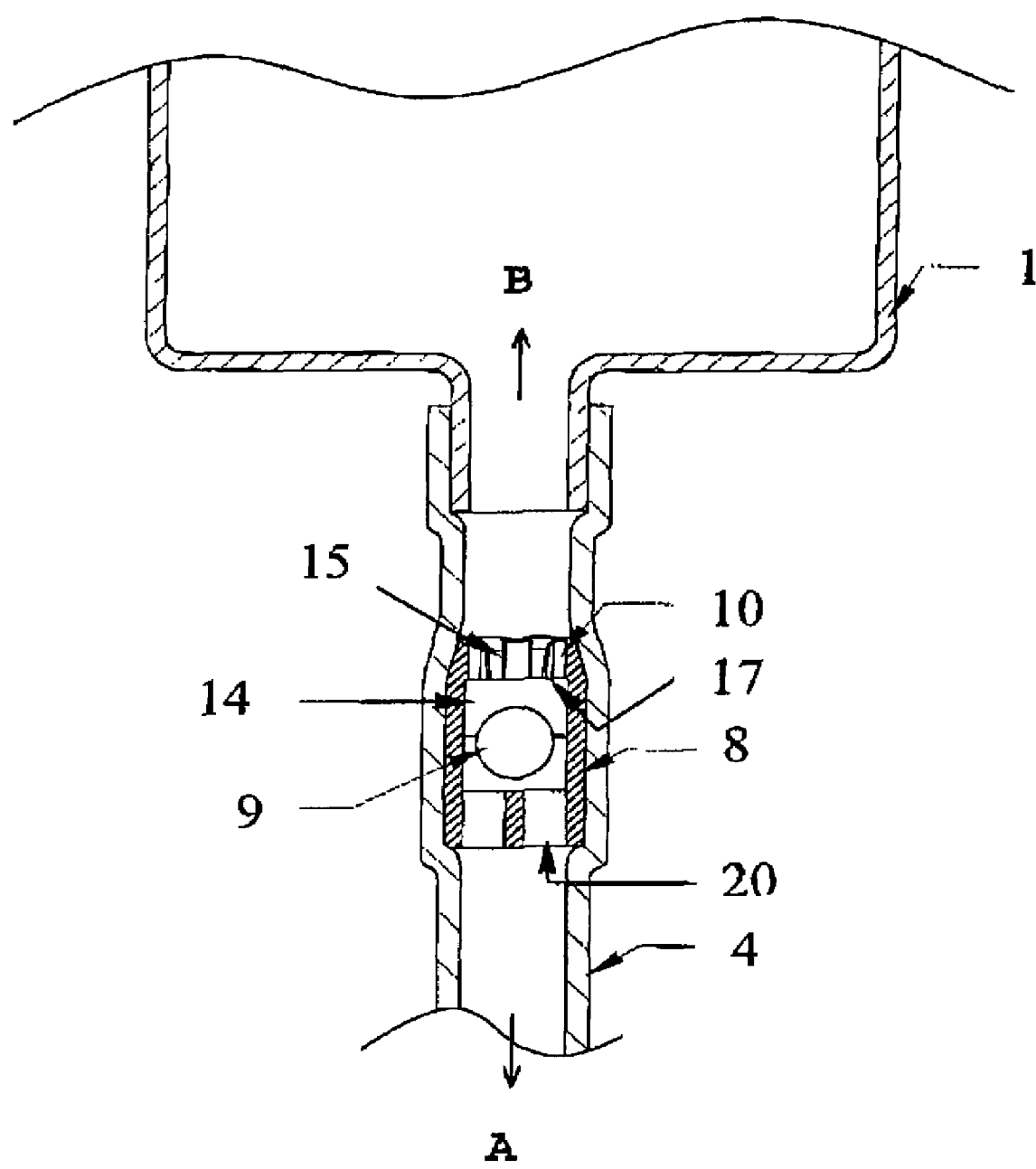
FIG. 2 illustrates a sectional view through a first embodiment of a flow control valve.

FIG. 2 illustrates a preferred embodiment of a dual flow control valve 6. This valve provides continuous two-way flow of water. However, the valve is adapted to permit substantially unrestricted flow in the forward (conventional) direction illustrated by arrow A, and a restricted or low flow rate in the reverse direction illustrated by arrow B. During the initial stages of water heating, when the valve is required to permit water to flow back to the reservoir 1, the pressure inside the in-line water heater 2 is low and therefore the flow rate is low. The effect of the valve 6 on reverse flow is minimal and water can return to the reservoir 1. However, as the steam pressure in the in-line water heater 2 builds to normal operating pressure the higher operating flow rates are generated and the valve operates to prevent a substantial portion of these normal flow rates from returning to the reservoir 1. Under normal operating conditions the water flow is substantially restricted to the conventional direction in the delivery tubes 4 and 5 towards the brew basket 3.

Figure 4:
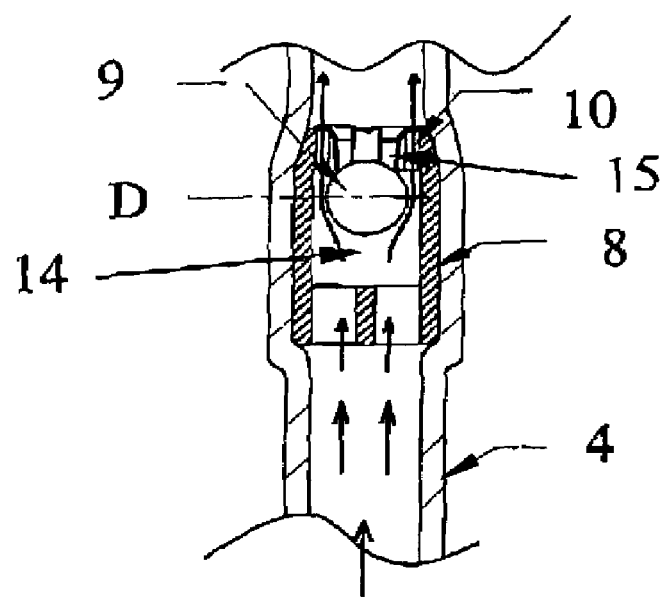
FIG. 4 illustrates flow of water in a second direction through the valve in FIG. 2, FIGS. 5 to 8 illustrate the control positions of a second embodiment of a flow control valve.
Figure 3:
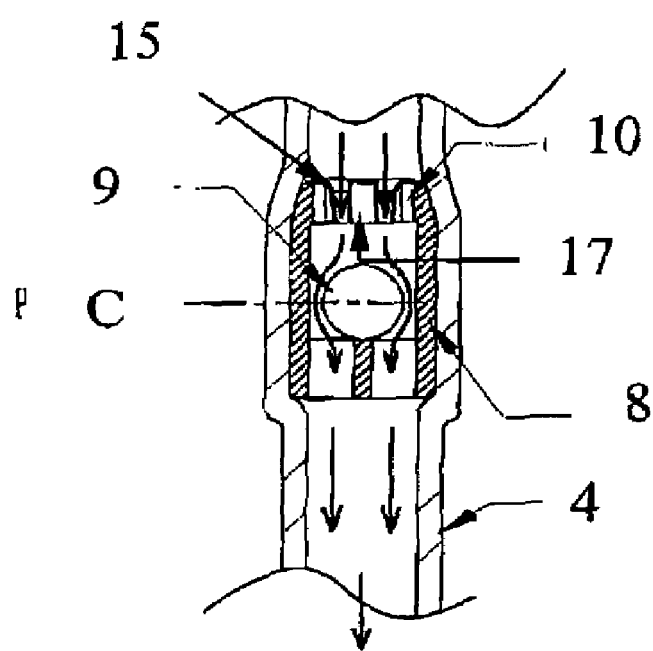
FIG. 3 illustrates flow of water in a first direction through the valve in FIG. 2.

Referring to FIGS. 2 to 4, the preferred embodiment of valve 6 comprises a valve housing 8 having a water passage between an inlet 15 and outlet 20. At the centre of the water passage is a valve chamber 14. An inlet portion 15 of the water passage leads to valve chamber 15 via a valve seat 17. Adjacent to inlet portion 15 of the water passage the valve seat 17 has recesses 10. A spherical valve plug 9 is disposed within the valve chamber 14. The valve plug 9 is free to move inside the chamber 14 of valve housing 8 between a first open position along the water flow direction (C in FIG. 3) and a second seated position in juxtaposition the valve seat 17 (D in FIG. 4).

The valve housing 8 is securely mounted to the inside of the water delivery tube 4 by frictional press fitting or other mechanical fixing method. One end of the water delivery tube 4 connects to the water supply reservoir 1 and the other end connects to the in-line water heater 2.

Referring to FIG. 3, at the beginning of a brew cycle relatively cooler water flows from the water supply reservoir 1 to the in-line water heater 2 in the (conventional) direction of the arrows through valve 8. The valve plug 9 will follow the water flow direction and stop at the first open position C.

Referring to FIG. 4, as the water inside the in-line water heater 2 is heated it expands in volume and creates pressure. Not all the water inside the in-line water heater 2 is fully heated to the required temperature, but the expansion pressure created by heated water will force this partially heated water to both outlet ends of the in-line water heater 2. Water will want to flow back to reservoir 1. The valve plug 9 will be pushed by this partially heated towards the valve seat 17 to the seated position D closing the inlet portion 15 of the valve water passage. However, the reverse flow is not completely blocked due to the presence of recesses 10 on the surface of valve seat 17. The recesses 10 allow partial heated water to bypass plug 9 and flow back to the water supply reservoir 1.

The partial heated water, which flows in the reverse direction, will mix with the relatively cooler water inside the water supply reservoir 1 and then flow back into the in-line water heater 2 through the dual-flow control valve 6. Thus an internal recycle heating process is created which retains the water inside the in-line water heater 2 for an extended period of time. This helps to improve the heat absorption of the water. Higher water temperature and correspondingly higher steam pressure is required to push the heated water up through the water delivery tube 5 and in to the brew basket 3 due to pressure loss in reverse flow of heated water towards the water supply reservoir 1.

Controlling the size, or number, of recesses 10 in the valve seat 17 varies the degree of internal recycle heating during the brew process. The size, or number, of the recesses 10 is determined by matching the geometry of the valve housing 8 and valve plug 9. The matching geometry could also be altered through the dimension of some moulded parts of the valve 6 or by some electromechanical means that can be activated to affect the size of the recesses 10.

FIGS. 5 to 8 illustrate an alternative embodiment of a dual-flow control valve 6. In this embodiment the recesses 10 in valve seat 17 are omitted so that the valve plug 9 can completely seal the inlet portion 15 of the water passage. An actuator 18 is provided to control the position of valve plug 9. During the initial stages of heating when reverse flow is required the actuator 18 holds valve plug 9 in the open position against the reverse flow of water. The actuator 18 can be activated by either the use of a solenoid, an electric motor or temperature sensitive device such as a bi-metal.

In the alternative embodiment the valve is disposed adjacent an elbow in delivery tube 4. A control stem 12 passes through an opening in the elbow and inlet portion 15 of the valve water passage. The inlet opening 15 and control stem 12 are dimensioned so as not to unduly affect the flow rate through inlet opening 15. A rubber gasket 11 covers and seals control stem 12. The control stem 12 works with a biasing spring 13 inside the water delivery tube 4 and it is able to move along the water flow path at the extreme end (nearer to the water supply reservoir 1) of the valve 6. The position of the control stem 12 controls the end stopping position of the valve plug 9 and thus alters the degree of internal recycle heating which in turn affects the resulted brewed coffee temperature.

Figure 6:
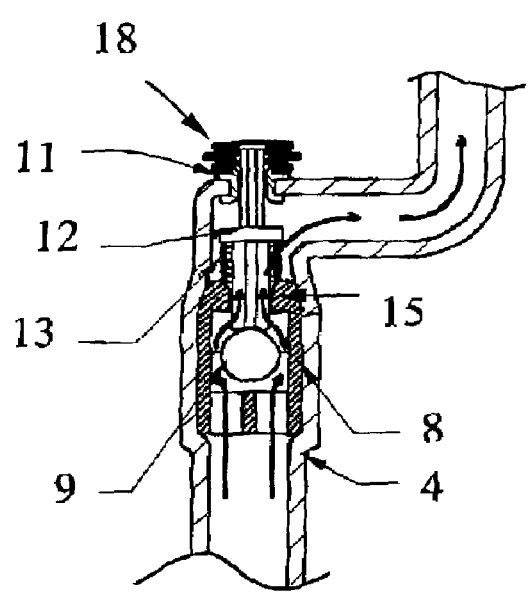
Figure 5:
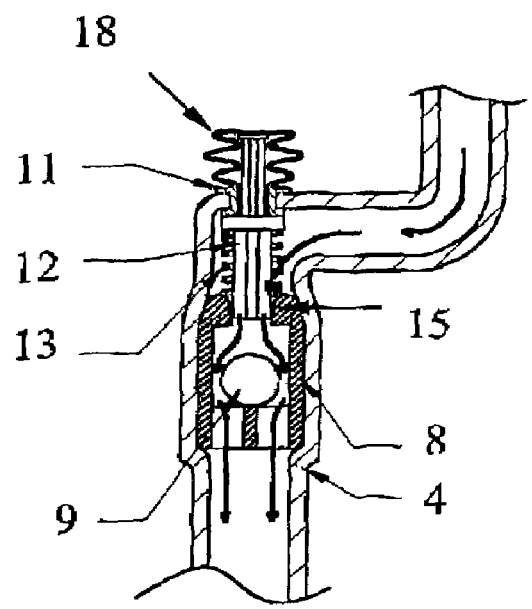

Referring to FIG. 6, when the control stem 12 moves fully into the valve housing 8, and compresses the biasing spring 13, it will engage the plug 9 to hold the valve substantially fully open as the partially heated water flows in the reverse direction back to the water supply reservoir 1. In this position the degree of internal recycle heating is maximized. Higher water temperatures and pressure are required to force out the heated water along delivery tube 5 to the filter basket 3.

Figure 7:
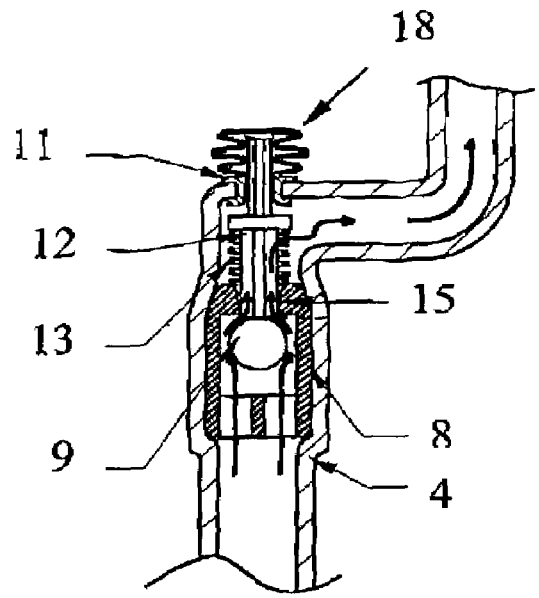
Figure 10:
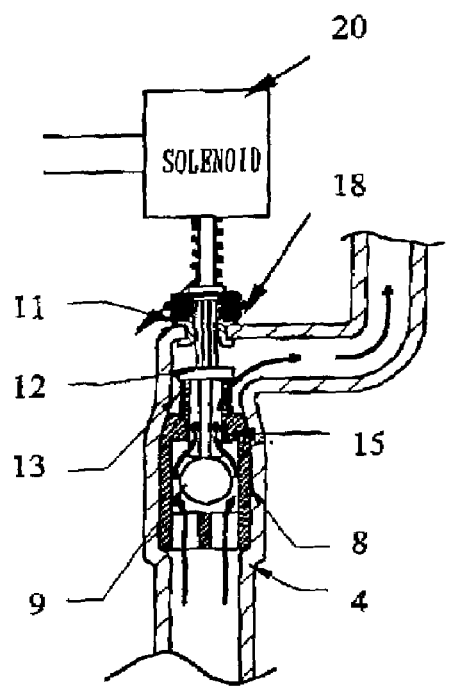
FIGS. 9 to 12 illustrate solenoid control of the valve positions in FIGS. 5 to 8, and FIGS. 13 to 16 illustrate cam control of the valve positions in FIGS. 5 to 8.
Figure 9:
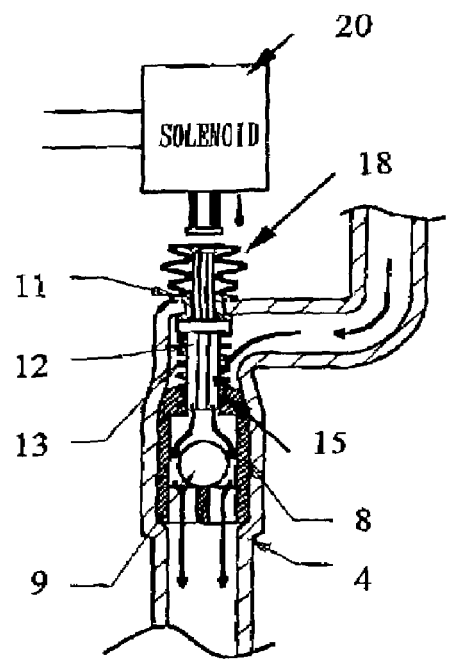
Figure 12:
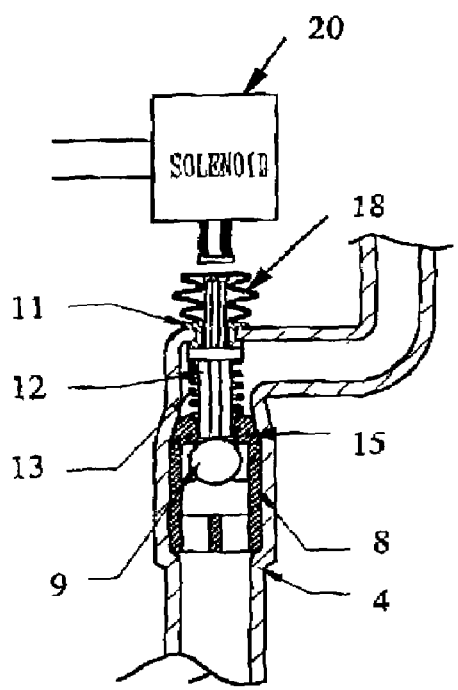
Figure 11:
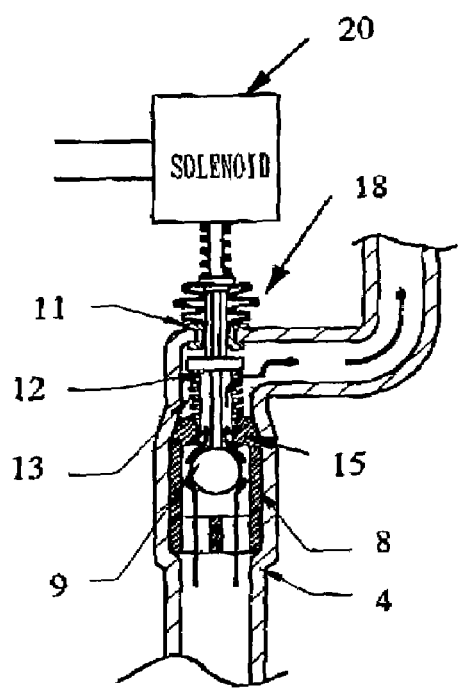
Figure 14:
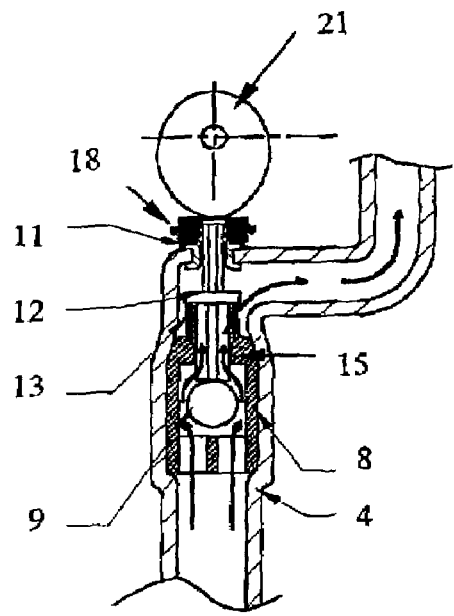
Figure 13:
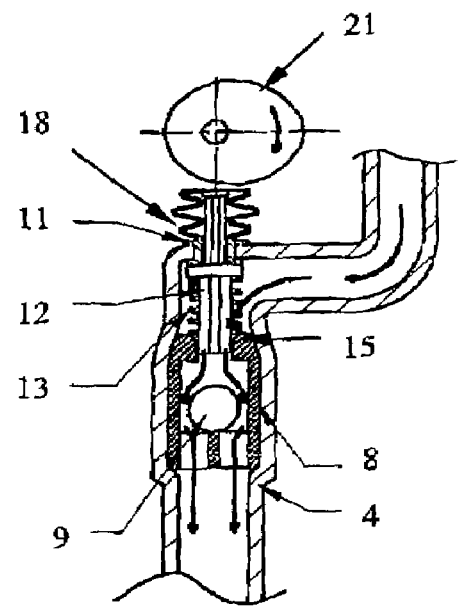
Figure 16:
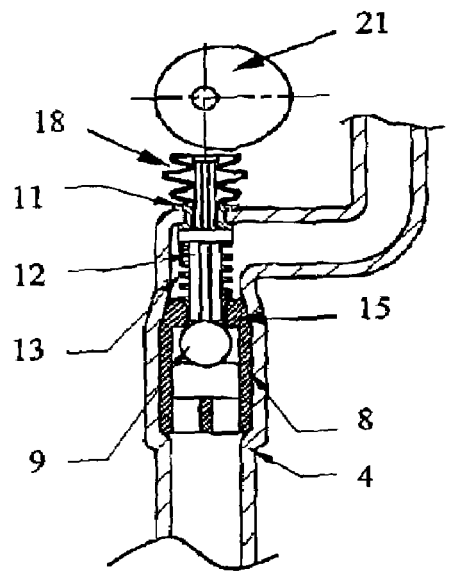
Figure 15:
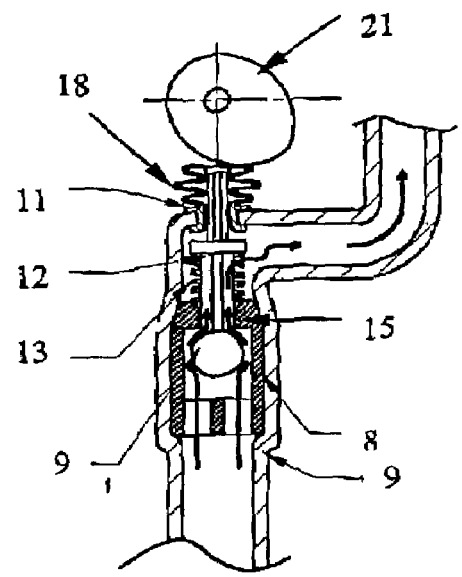

Referring to FIG. 7, when the control stem 12 moves to a partially open position, and compresses the biasing spring 13 slightly, the valve plug 9 is held partially open. Only minor internal recycle heating is allowed due to reduced opening of the valve.

Figure 8:
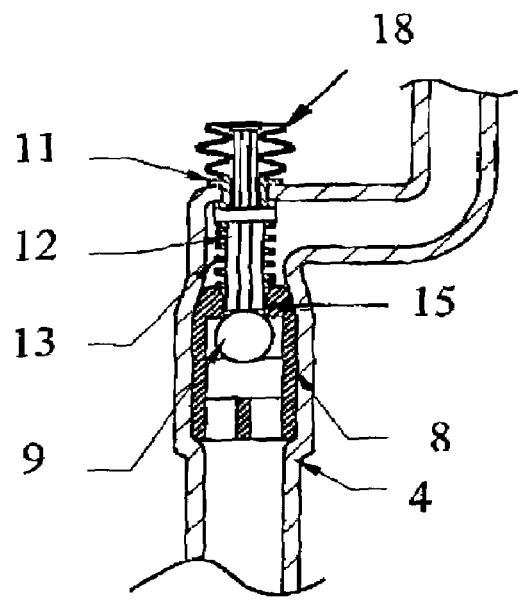

Referring to FIG. 8, when the control stem 12 is fully retracted from the valve housing 8 under the action of the biasing spring 13 the valve plug 9 sits against the valve seat 17 to completely close the water passage as in a conventional coffeemaker one-way valve. In this position, the heated water inside the in-line water heater 2 will be more easy to push out due to no loss in pressure and internal recycle heating.

Exerting external force on top of the gasket 11 activates the movement of the actuator 18 and compresses the biasing spring 13. The external activation force is created by some external means to control the reverse opening of the valve 6 and thus the degree of internal recycle heating.

Preferably, the activation force is an electric solenoid 20 as shown in FIGS. 9 to 12. Alternatively, a cam 21 is used as the external aggravation force as shown in FIGS. 13 to 16. The cam 21 is driven by an electric motor (not shown). FIGS. 9 to 12 and FIGS. 13 to 16 correspond to the respective stem 12, and valve plug 9, positions shown in FIGS. 5 to 8 and described above.

In other embodiments the activation force may be a temperature sensitive device like bimetal or other such combination. The use of sophisticated electronic circuitry is also a possible option to control and drive other corresponding mechanisms. The valve is restricted to the fully open position at the start of the brewing cycle so as to achieve maximum internal recycle heating effect. This is particularly helpful to the overall final brewing temperature due to the present of cold-water column on the water delivery tube 5. As the brewing cycle proceeds, the actuator 18 is adjusted to reduce the reverse opening of the valve 6.

Where in the foregoing description reference has been made to integers or elements having known equivalents then such are included as if individually set forth herein.

Embodiments of the invention have been described, however it is understood that variations, improvements or modifications can take place without departure from the spirit of the invention or scope of the appended claims.

What we claim is:

1. A coffee maker comprising;
   a water reservoir,
   an in-line water heater,
   a brew basket for receiving coffee grinds,
   a water passage between the reservoir and the brew basket, the passage passing through the in-line water heater for delivering heated water to the brew basket, and
   a bi-directional valve having an inlet and an outlet located in the water passage between the water reservoir and the in-line water heater, the valve permitting a substantially unrestricted flow in a first direction from the inlet to the outlet and a restricted flow in a second direction from the outlet to the inlet.

2. A coffee maker as claimed in claim 1 wherein the valve comprises a housing with a water passage through it, a valve seat disposed within the water passage, and a valve body disposed within the water passage and movable from a first position clear of the valve seat and a second position against the valve seat, and wherein the valve seat has one or more recesses in it to permit restricted flow when the valve body is in the second position.

3. A coffee maker as claimed in claim 1 wherein restricted flow in the second direction is sufficient to reduce the volume of water delivered to the brew basket until the water is heated to a predetermined temperature.

4. A coffee maker comprising:
   a water reservoir,
   an in-line water heater,
   a brew basket for receiving coffee grinds,
   a water passage between the reservoir and the brew basket, the passage passing through the in-line water heater for delivering heated water to the brew basket,
   a valve having an inlet and an outlet located in the water passage between the water reservoir and the in-line water heater, and
   a controller for altering the valve between a bi-directional mode permitting a first flow in a first direction from the inlet to the outlet and a second flow in a second direction from the outlet to the inlet and a unidirectional mode permitting only the first flow from the inlet to the outlet.

5. A coffee maker as claimed in claim 4 wherein the valve is in the bi-directional mode for a predetermined time or until water in the passage between the reservoir and the brew basket reaches a predetermined temperature, and the valve is then altered to the unidirectional mode.

6. A coffee maker as claimed in claim 4 wherein the controller is an electromechanical or bimetal device.

7. A coffee maker as claimed in claim 4 wherein the controller is a bimetal device incorporated within the valve and adapted to control the valve in the bi-directional mode until water in the water passage reaches a predetermined temperature, and then alter the valve to the unidirectional mode.

8. A coffee maker as claimed in claim 4 wherein the valve includes a housing with a water passage through it, a valve seat disposed within the water passage, a valve body disposed within the water passage and movable from a first position clear of the valve seat and a second position in juxtaposition the valve seat, and a control stem movable between a bi-directional position in which the control stem engages the valve body in the first position and a unidirectional position in which the valve body is free to move between the first and second positions.

9. A coffee maker comprising:
   a water reservoir,
   an in-line water heater,
   a brew basket for receiving coffee grinds,
   a water passage between the reservoir and the brew basket, the passage passing through the in-line water heater for delivering heated water to the brew basket, and
   a bi-directional valve located in the water passage between the water reservoir and the in-line water heater for permitting an unrestricted flow from the reservoir to the water heater and a restricted flow from the water heater to the reservoir, the valve comprising:
   a housing with a water passage through it, a valve seat disposed within the water passage, and a valve body disposed within the water passage and movable from a first position clear of the valve seat and a second position against the valve seat, and wherein the valve seat has one or more recesses in it permitting the restricted flow when the valve body is against the seat.

* * * * *